United States Patent [19]

Lobb

[11] Patent Number: 5,456,844
[45] Date of Patent: Oct. 10, 1995

[54] BATCH PROCESS AND APPARATUS

[75] Inventor: Kevin J. Lobb, Morley, Australia

[73] Assignee: Modern Environmental Service Trust, Gidgegannup, Australia

[21] Appl. No.: 150,139

[22] PCT Filed: May 29, 1992

[86] PCT No.: PCT/AU92/00251

§ 371 Date: Apr. 19, 1994

§ 102(e) Date: Apr. 19, 1994

[87] PCT Pub. No.: WO92/21444

PCT Pub. Date: Dec. 10, 1992

[30] Foreign Application Priority Data

May 29, 1991 [AU] Australia ................ PK6406

[51] Int. Cl.$^6$ .................................................. C02F 1/52
[52] U.S. Cl. .................... 210/708; 210/711; 210/714; 210/727; 210/208
[58] Field of Search .................. 210/702, 708, 210/710, 711, 714, 715, 725, 727, 728, 738, 205, 208, 523

[56] References Cited

U.S. PATENT DOCUMENTS

| | | | |
|---|---|---|---|
| 2,352,772 | 7/1944 | Darby | 210/208 |
| 2,391,738 | 12/1945 | Pragerl | 210/715 |
| 2,613,181 | 10/1952 | Green et al. | 210/711 |
| 3,579,443 | 5/1971 | Horst | 210/738 |
| 3,869,408 | 3/1975 | Herce et al. | 210/708 |
| 4,927,543 | 5/1990 | Bablon et al. | 210/738 |
| 4,997,573 | 3/1991 | Browne | 210/714 |
| 5,039,428 | 8/1991 | Wentzler et al. | 210/912 |

FOREIGN PATENT DOCUMENTS 1200364  7/1970  United Kingdom ............... 210/715

Primary Examiner—Peter A. Hruskoci
Attorney, Agent, or Firm—Michael, Best & Friedrich

[57] ABSTRACT

A process and apparatus for batch treatment of a liquor to separate, by way of example, a suspension of a contaminant from a liquor is disclosed. The batch treatment apparatus comprises, a single batch vessel that has discharge outlets at an upper and a lower level of the vessel, and an agitator that is operable in accordance with the batch treatment process to mix the contents of the vessel. The batch treatment process comprises, forming floccs of the contaminants and a carrier which settle rapidly towards the base of the vessel, discharging the relatively contaminant free liquor through the upper discharge outlet, breaking bonds of the floccs so that the carrier separates from a sludge of the contaminant and flocculent residue, discharging the sludge through the lower discharge outlet, and re-using the carrier in the treatment of a new batch of liquor.

4 Claims, 2 Drawing Sheets

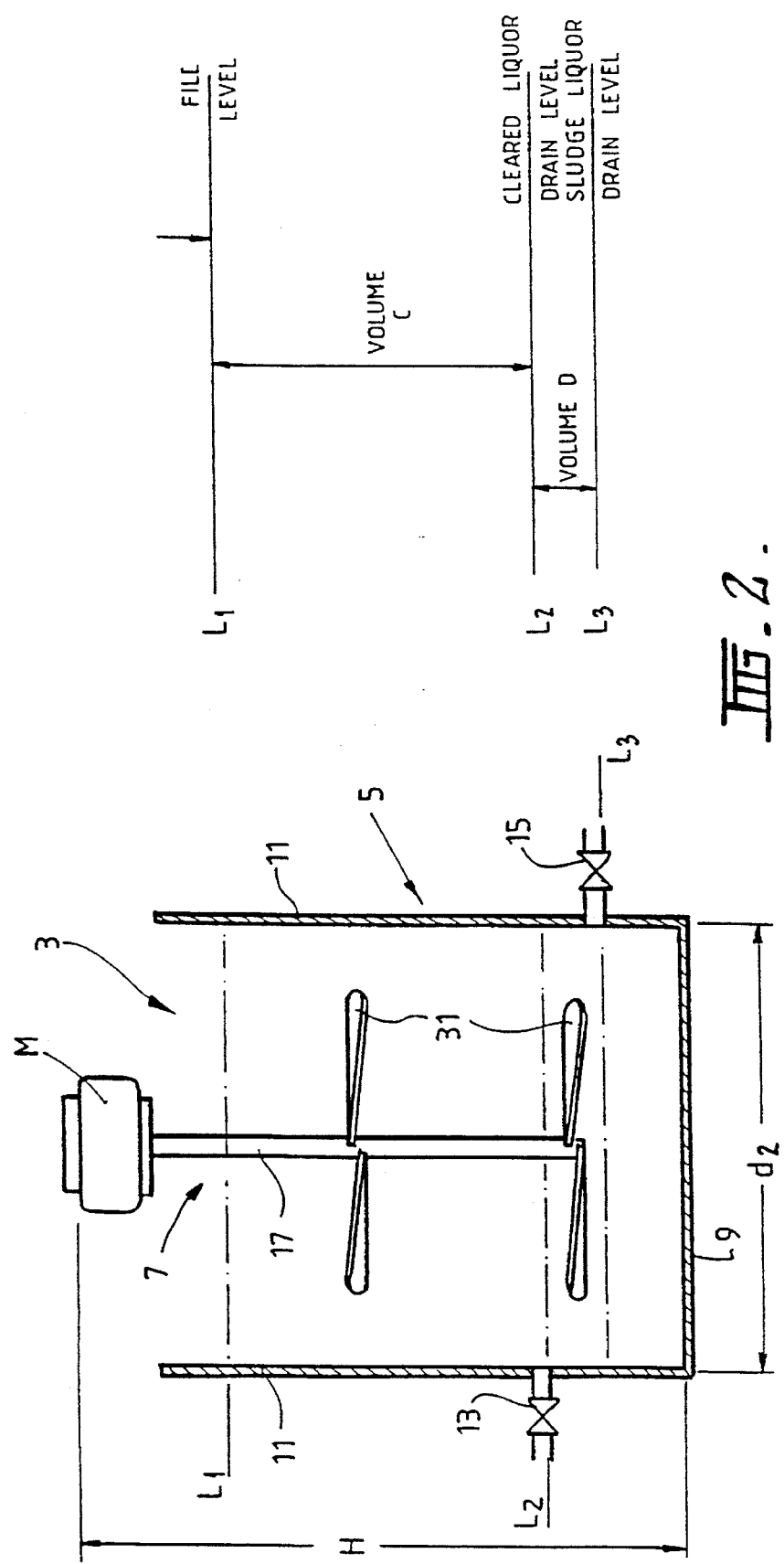

BATCH PROCESS AND APPARATUS

The present invention relates to a process and an apparatus for batch treatment of liquors.

International patent applications PCT/AU88/00303 and PCT/AU90/00059 in the name of Golconda Engineering and Mining Services Pty Ltd disclose a process (hereinafter referred to as the "Golconda process") for separating suspended solids from liquors which is based on the addition of an inert particulate carrier and a polyelectrolyte flocculent to the liquors.

The applicant has developed a series of processes for treating a wide range of liquors. These processes include, inter alia, the treatment of aqueous liquors to remove soluble silica and the treatment of emulsions to separate the components of the emulsions. The processes developed by the applicant include the use of particulate material which is added to the liquors with a polyelectrolyte flocculent.

In a general sense the Golconda process and the processes developed by the applicant are concerned with separating one or more components of a liquor from the liquor by the use of particulate material (which is described hereinafter for the purpose of consistency as "inert particulate carrier").

The Golconda process and the processes developed by the applicant are suitable for operation on a continuous basis and a batch basis. However, in relation to batch operation, there is no known cost effective and efficient process and apparatus for batch treatment of liquors in accordance with the Golconda process and the processes developed by the applicant and such processes in general.

An object of the present invention is to provide a process and an apparatus for batch treatment of liquors in accordance with processes such as the Golconda process and processes developed by the applicant.

According to the present invention there is provided a process for batch treatment of a liquor to separate a component from the liquor, comprising:

(a) mixing together in a batch vessel prescribed amounts of the liquor, an inert particulate carrier, and a flocculent, under conditions selected to optimise separation of the component from the liquor, to form floccs of the component of the liquor, the inert particulate carrier and the flocculent that will settle towards the base of the batch vessel;

(b) allowing the floccs to settle towards the base of the batch vessel so that the contents of the batch vessel separate into a bottom layer of floccs and a top layer of liquor which is relatively free of the component;

(c) draining a portion of the top layer of liquor from the batch vessel;

(d) breaking the bonding effect of the floccs;

(e) allowing the inert particulate carrier separated from the floccs to settle so that there is formed a bottom layer of inert particulate carrier and a top layer of sludge comprising the component and flocculent residue; and (f) draining the sludge from the inert particulate carrier.

The term "liquor" as used herein is understood to include aqueous and non-aqueous liquids. In this regard, it is noted that the term "liquor" as used herein is understood to include mixtures of aqueous and non-aqueous liquors, such as emulsions. In addition, it is noted that the term "liquor" as used herein is understood to include aqueous and non-aqueous liquors, and mixtures thereof, which contain contaminants:

(a) in dissolved form;

(b) in particulate form suspended in the liquid phase(s); and/or (c) in colloidal form.

The term "inert" as used herein in relation to "particulate carrier" is understood to mean that the particulate carrier is not substantially attacked by the liquor. In other words, the term "inert" means that the particulate carrier exhibits both suitable chemical and physical stability in the liquor.

It is preferred that the flocculent is a polyelectrolyte flocculent.

The term "polyelectrolyte flocculent" as used herein is understood to mean any suitable cationic, non-ionic and anionic flocculent.

The selected conditions to optimise separation of the component from the liquor will vary depending on the component and the particular treatment process. In this regard, the term "component" as used herein is understood to include, although it is not limited to, the contaminants discussed above. A further example of a "component" is the dispersed phase of an emulsion.

It is preferred that the inert particulate carrier left in the batch vessel after step (f) above is retained therein so that the inert particulate carrier can be re-used when the process steps (a) to (f) are repeated to treat a new batch of liquor.

It is preferred that the inert particulate carrier comprises sand, alumina, magnetite, hematite, ilmenite, garnet and calcite. The inert particulate carrier may comprise any other suitable material.

It is preferred that step (d) above comprises agitating the floccs a sufficient extent to break the bonding effect of the floccs.

According to the present invention there is also provided an apparatus for batch treatment of a liquor to separate a component from the liquor, the apparatus comprising:

(a) a batch vessel for receiving the liquor, an inert particulate carrier, and a flocculent, the batch vessel having a first discharge outlet at a first level thereof for removing liquor that is relatively free of the component and a second discharge outlet at a second lower level thereof for removing a sludge containing the component; and (b) an agitator means operable, firstly, to mix together prescribed amounts of the liquor, the inert particulate carrier, and the flocculent under conditions selected to optimise separation of the component from the liquor to form floccs of the inert particulate carrier, the component of the liquor and the flocculent and, secondly, to mix the contents of the batch vessel to break up the floccs once the floccs have formed and been allowed to settle and the liquor that is relatively free of the component has been discharged through the first discharge outlet.

It is preferred that the agitator means comprises, a central shaft having a cross member at a lower end thereof and a pair of spaced apart prongs extending downwardly and parallel to the central shaft from opposed ends of the cross member, and a motor operable to rotate the prongs about the longitudinal axis of the central shaft.

Alternatively, it is preferred that the agitator means comprises, a central shaft, at least one propeller member connected to the central shaft, and a motor operable to rotate the or each propeller about the longitudinal axis of the central shaft.

It is preferred particularly that the spacing of the prongs is about one quarter of the diameter of the batch vessel.

It is preferred that the apparatus further comprises a series of baffles in the batch vessel to cause turbulent flow of the contents of the batch vessel to promote mixing and breaking up of the floccs.

BRIEF DESCRIPTION OF THE DRAWINGS

The present invention is described further with reference to the accompanying drawings in which:

FIG. 2 is a vertical section through another preferred embodiment of a batch apparatus formed in accordance with the present invention.

Figure 1:
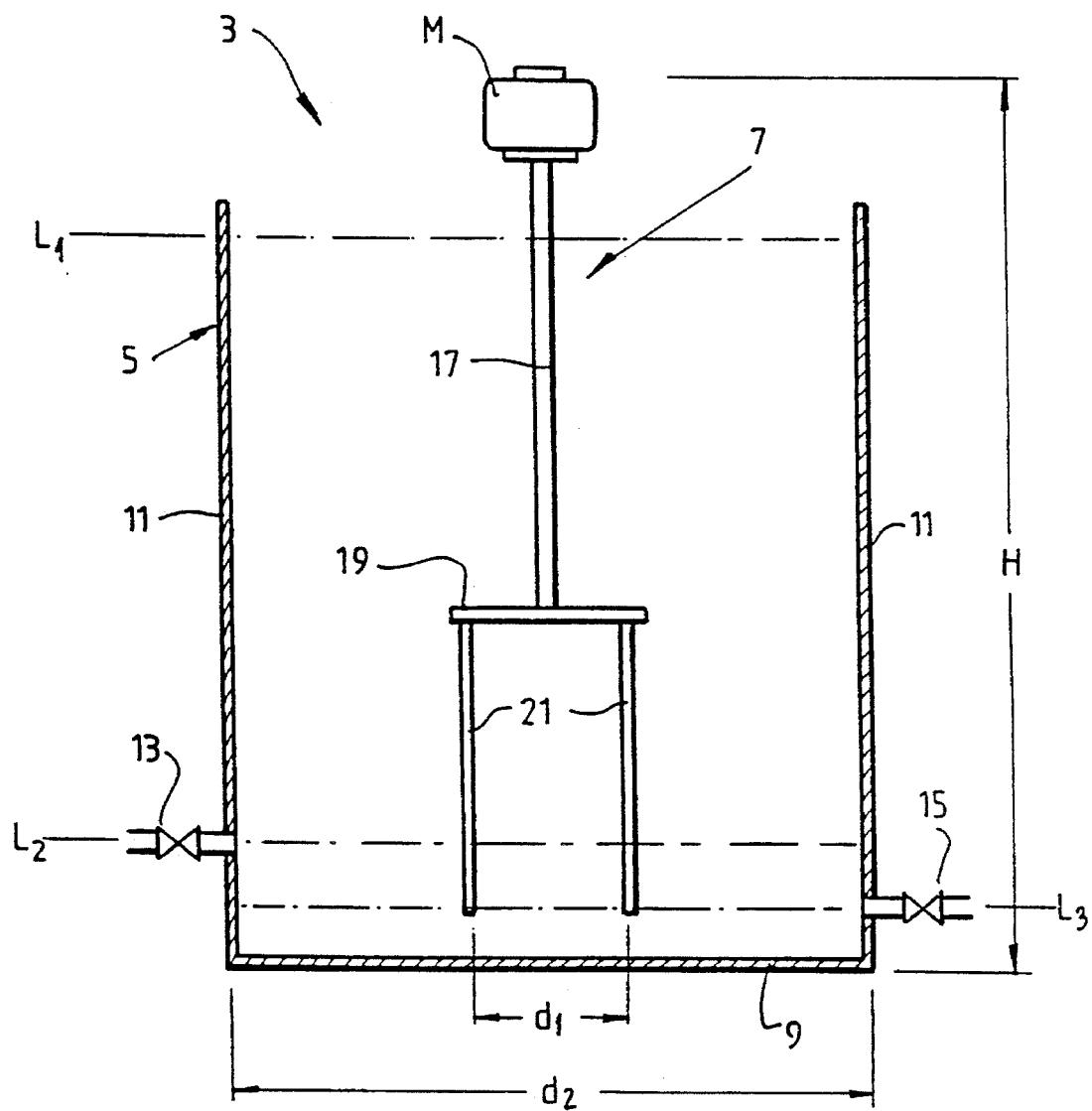
FIG. 1 is a vertical section through one preferred embodiment of a batch apparatus formed in accordance with the present invention.

For the purpose of clarity the preferred embodiments and the operation thereof are described hereinafter in connection with the removal of suspended solids from a liquor in accordance with the Golconda process. It is noted that the preferred embodiments and the operation thereof are not restricted to this application and could be used in connection with the processes developed by the applicant and other such processes which in a general sense are concerned with separating a contaminant from a liquor by the use of an inert particulate carrier.

With reference to the drawings, in each preferred embodiment the batch apparatus 3 shown comprises a batch vessel 5 for receiving and processing a liquor containing suspended solids, an agitator assembly 7 for mixing the contents of the batch vessel 5, and a variable speed motor M for operating the agitator assembly 7.

The batch apparatus 3 further comprises a series of baffles (not shown) in the batch vessel 5 to promote turbulent flow of the contents of the batch vessel 5 when the agitator assembly 7 is actuated.

The batch vessel 5 may be of any suitable size and configuration and comprises a base 9 and side walls 11. The batch vessel 5 further comprises a first discharge outlet 13 at a level $L_2$ and a second discharge outlet 15 at a lower level $L_3$.

In the preferred embodiment shown in FIG. 1, the agitator assembly 7 comprises a central shaft 17 which is located centrally in the batch vessel 5, a cross-member 19 at a lower end of the central shaft 17, and a pair of downwardly extending parallel prongs 21 separated by a distance $d_1$. It is preferred that the distance $d_1$ is one quarter of the width $d_2$ of the batch vessel 5.

In the preferred embodiment shown in FIG. 2, the agitator assembly 7 also comprises a central shaft 17 located centrally in the batch vessel 3 and also comprises a pair of spaced apart propellers 31 connected to the central shaft 17. It is preferred that the upper propeller 31 is located above the level $L_2$ and the lower propeller 31 is located above the level $L_3$ and below the level $L_2$.

In use of each preferred embodiment of the batch apparatus 3 in accordance with a preferred embodiment of a batch process of the present invention, the batch vessel 5 is filled to a level $L_1$ with liquor containing suspended solids, inert particulate carrier, and polyelectrolyte flocculent, with the conditions within the batch vessel, such as the type and amounts of the inert particulate carrier and polyelectrolyte flocculent, selected to optimise separation of the suspended solids. In addition, in some situations in order to produce optimum separation conditions it may be necessary to adjust the pH of the liquor and/or add suitable coagulants. The components may be added separately or simultaneously, although it is noted that it is generally preferred to add the liquor, the inert particulate carrier, and any coagulants prior to the polyelectrolyte flocculent.

After the batch vessel 5 is filled to the level $L_1$ the variable speed motor M is actuated to rotate the agitator assembly 7 about the longitudinal axis of the central shaft 17 at a first relatively low speed selected to promote thorough mixing of the contents of the batch vessel 5 to optimise formation of floccs of the inert particulate carrier, suspended solids and polyelectrolyte flocculent.

Once the contents are thoroughly mixed the variable speed motor M is stopped and the floccs settle rapidly towards the base 9 of the batch vessel 5. The level $L_2$ of the first discharge outlet 13 of the batch vessel 5 is selected so that the floccs settle to a level below the level $L_2$.

The first discharge outlet 13 is then opened so that the relatively clarified liquor above the level $L_2$ drains from the batch vessel 5 for further treatment and/or disposal, as required.

Once the relatively clarified liquor is removed from the batch vessel 5, the variable speed motor M is actuated to rotate the agitator assembly 7 at a second speed which is preferably higher than the first speed and is selected to result in agitation of the remaining liquor and the floccs to cause the floccs to break up. The variable speed motor M is then stopped and the inert particulate carrier separated from the floccs settles downwardly and forms a layer on the base 9 of the batch vessel and the remaining liquor, suspended solids and polyelectrolyte residue form a sludge on top of the layer of inert particulate carrier. The level $L_3$ of the second discharge outlet 15 is selected so that the sludge is above the level $L_3$.

The second discharge outlet 15 is then opened so that the sludge drains from the batch vessel 5 for further treatment and/or disposal, as required.

Typically, batch vessel 5 is cylindrical and the dimensions of the batch vessel 5 are selected as set out in the following table.

| Volume of Relatively Clarified Liquor between Levels $L_1$ and $L_2$ (liters) | Volume of Sludge between Levels $L_2$ and $L_3$ (liter) | Diameter d (mm) | Height H (mm) |
| --- | --- | --- | --- |
| 500 | 50 | 850 | 1600 |
| 1000 | 100 | 1000 | 1900 |
| 1500 | 150 | 1300 | 2100 |
| 2000 | 200 | 1400 | 2380 |

Many modifications may be made to the preferred embodiments of the present invention without departing from the spirit and scope of the present invention.

In this regard, it is noted that, whilst the preferred embodiments include prongs 21 and propellers 31 and a variable speed assembly, the present invention is not limited to such an arrangement and any suitable mixing/agitating means may be used.

The claims defining the invention are as follows; I claim:

1. A process for batch treatment of a liquor in a batch vessel to separate a component from the liquor, comprising:

(a) mixing together in the batch vessel, the liquor, an inert particulate carrier, and a flocculent to form floccs of the component of the liquor, the inert particulate carrier and the flocculent;

(b) allowing the floccs to settle towards the base of the batch vessel so that the contents of the batch vessel separate into a bottom layer of floccs and a top layer of liquor which is relatively free of the component;

(c) draining a portion of the top layer of liquor from the batch vessel;

(d) agitating the floccs in the batch vessel to break up the floccs and separate from the floccs the inert particulate carrier;

(e) allowing inert particulate carrier separated from the floccs in step (d) to settle in the batch vessel so that there is formed a bottom layer of inert particulate carrier and a top layer of sludge comprising the component and flocculent residue; and (f) draining the sludge from the inert particulate carrier.

2. The process defined in claim 1, wherein the component is a contaminant and/or a dispersed phase of an emulsion.

3. The process defined in claim 1, wherein the inert particulate carrier is selected from the group consisting of sand, garnet, alumina, magnetite, hematite, ilmenite, and calcite.

4. A process for batch treatment of a liquor in a batch vessel to separate a component from the liquor, comprising:

(a) mixing together in the batch vessel the liquor, an inert particulate carrier, and a flocculent to form floccs of the component of the liquor, the inert particulate carrier and the flocculent;

(b) allowing the floccs to settle towards the base of the batch vessel so that the contents of the batch vessel separate into a bottom layer of floccs and a top layer of liquor which is relatively free of the component;

(c) draining a portion of the top layer of liquor from the batch vessel;

(d) agitating the floccs in the batch vessel to break up the floccs and separate from the floccs the inert particulate carrier;

(e) allowing inert particulate carrier separated from the floccs to settle in the batch vessel so that there is formed a bottom layer of inert particulate carrier and a top layer of sludge comprising the component and flocculent residue;

(f) draining the sludge in the batch vessel from the inert particulate carrier; and (g) retaining the inert particulate carrier left in the batch vessel after step (f) and re-using the inert particulate carrier to treat a new batch of liquor.

* * * * *

UNITED STATES PATENT AND TRADEMARK OFFICE
CERTIFICATE OF CORRECTION

PATENT NO. : 5,456,844
DATED : Oct. 10, 1995
INVENTOR(S) : Kevin J. Lobb

It is certified that error appears in the above—identified patent and that said Letters Patent is hereby corrected as shown below:

On the cover page, delete the following:

Assignee: Modern Environmental Service Trust,
           Gidgegannup, Australia

On the cover page, Add the following:
  Assignee: Dawn Annette Hoefer, trustee of
          Modern Environmental Service Trust,
          Gidgegannup, Australia Signed and Sealed this Second Day of April, 1996

Attest:

BRUCE LEHMAN

Attesting Officer       Commissioner of Patents and Trademarks